United States Patent
Bringby et al.

(10) Patent No.: US 6,285,883 B1
(45) Date of Patent: Sep. 4, 2001

(54) ADAPTIVE HANDOFF HYSTERESIS IN WIRELESS TELECOMMUNICATION NETWORKS

(75) Inventors: Daniel Bringby, Huddinge; Per Wijk, Göteborg; Tomas Lundborg, Stockholm, all of (SE)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 0 days.

(21) Appl. No.: 08/998,065

(22) Filed: Dec. 24, 1997

(51) Int. Cl.$^7$ ........................................ H04Q 7/20
(52) U.S. Cl. .................. 455/437; 455/436; 370/331; 370/332
(58) Field of Search .......................... 455/437, 436, 455/421, 426, 442, 443, 432, 439; 375/436; 379/60; 370/331, 332

(56) References Cited

U.S. PATENT DOCUMENTS

| 5,379,446 | * | 1/1995 | Murase | 455/33.2 |
| 5,396,645 | * | 3/1995 | Isrealson | 455/33.4 |
| 5,513,246 | * | 4/1996 | Jonsson et al. | 379/60 |
| 5,640,677 | * | 6/1997 | Karlsson | 455/33.2 |
| 5,701,585 | * | 12/1997 | Kallin et al. | 455/33.2 |
| 5,737,689 | * | 4/1998 | Isrealson | 455/33.2 |
| 5,995,836 | * | 11/1999 | Wijk et al. | 455/436 |

\* cited by examiner

Primary Examiner—William Trost
Assistant Examiner—Congvan Tran
(74) Attorney, Agent, or Firm—Burns, Doane, Swecker & Mathis, L.L.P.

(57) ABSTRACT

A method of setting the appropriate hysteresis for cells in a wireless telecommunication network in order to reduce the rate of oscillating handoffs arising from a routine mobile station handoff from an originating cell to a neighboring cell. The method includes measuring the received signal strength in the originating cell and the received signal strength of at least one neighboring cell. The hysteresis is calculated by applying a statistical operation, such as the standard deviation, to at least one of the received signal strengths. Alternatively, the hysteresis calculation may include the handoff oscillation rate. The calculated hysteresis value may be presented to the operator for manual adjustment or may be input into self-configuring cells for the dynamic adjustment of hysteresis levels to improve the network operating performance.

17 Claims, 2 Drawing Sheets

ADAPTIVE HANDOFF HYSTERESIS IN WIRELESS TELECOMMUNICATION NETWORKS

FIELD OF THE INVENTION

The present invention relates generally to handoff hysteresis for cells in wireless telecommunication networks. More specifically, the invention relates to a method of setting appropriate hysteresis levels for improving network performance.

BACKGROUND OF THE INVENTION

The operating performance of wireless telecommunication networks is of great interest to system operators. A significant area affecting the operating performance are handoff operations that occur when a mobile user moves from an originating cell to a neighboring cell. A handoff of the mobile user from an originating cell to a more suitable neighboring cell, in most systems is typically based on signal strength measurement of received signals. In analog telecommunication systems such as those operating in accordance with Advanced Mobile Phone Standard (AMPS), signal strength measurements together with supervisory audio tone (SAT) transmissions are used to determine the most suitable neighboring cell for handoff. In digital systems, such as those operating in accordance with Digital Advanced Mobile Phone System (D-AMPS) for example, the system routinely analyzes neighboring cells for an appropriate cell to handoff to. This analysis of neighboring cells typically relies on several criteria such as bit-error-rate (BER) measurements, propagation path loss measurements, and signal strength measurements i.e. signal integrity.

The integrity of signals are inherently affected by a number of factors such as obstructions such as terrain, building etc. which tends to cause log-normal fading. The combination of these factors tends to result in a received signal that is distorted by having fluctuating signal strength. FIG. 1 depicts a graph of signal strength versus distance from a base station (BS) for a typical transmitted signal received by a mobile station (MS). Curve 10 shows a theoretical representation of the undistorted signal in which the signal strength exponentially decreases with distance. Curve 11 is a representation of an actual signal containing fluctuations received the MS. These fluctuations can be significant i.e. as high as 3 dB or more even after filtering processes. Signal fluctuations have important implications for handoff operation i.e. inappropriate handoffs may be initiated when measuring the signal strength of a signal that is fluctuating. By way of example, a handoff is initiated when the received signal strength of a neighboring cell is greater than the received signal strength in the originating or serving cell. For a proper handoff event, this condition must remain true after the handoff in the neighboring cell. After handoff occurs to a neighboring cell, fluctuations in the received signal may result in a measurement in which the signal strength in the current cell is lower than that reported by the previous cell thereby causing an immediate handoff back to the original serving cell. The occurrence of an undesirable immediate handoff back to the original serving cell is referred to as an oscillating handoff. As an example, several oscillating handoffs may occur which are due to movement of the MS and corresponding signal fluctuations near the cell border.

One important parameter that can be set by the operator to reduce the rate of oscillating handoffs is the hysteresis level for the cell towards each neighbor cell. FIG. 2 illustrates the hysteresis associated with an exemplary omnidirectional cell. The output power of BS 12 will determine the location of the cell border 14 which therefore ultimately determines the size of the coverage area of the cell. Extending some distance further from cell border 14 is a secondary border 16 defined by the hysteresis. The depicted hysteresis is the difference between border 14 and border 16 which is essentially represented by segment 18.

an appropriate hysteresis level setting is an important factor in fine-tuning procedures to improve network performance. For example, a relatively low hysteresis level yields better handoff performance which is desirable for situations involving fast moving traffic e.g. along a highway. This is also desirable in microcell configurations where handoffs typically occur with high frequency. But unfortunately, a disadvantage with relatively low hysteresis levels is that it tends to increase occurrence of oscillating handoffs which thereby increases the processor load on the system, degrades speech quality and increases the risk of dropped calls.

On the other hand, a hysteresis level that is too large causes the cell to expand resulting in dragging handoffs i.e. lagging handoffs that can cause undesirable interference in neighboring cells. Furthermore, lagging handoffs may increase the risk of dropped calls due to weak signal strength. The cell expansion and interference effect is especially problematic in microcell configurations in high traffic areas where the already close proximity of the cells are particularly susceptible to interference. The increased interference may ultimately lead to lower voice quality and network capacity further degrading performance.

In the prior art, hysteresis levels are typically initially set to default value of around 3–5 dB which may be manually adjusted by studying traffic performance between cells. The technique for optimizing hysteresis can be tedious and labor intensive, especially in microcell environments where individual cells may require different hysteresis levels that are optimized in accordance with the traffic patterns experienced. Moreover, fixed hysteresis levels cannot dynamically maintain optimal levels when there are abrupt unanticipated changes in environmental conditions affecting signal transmissions. Another disadvantage of manual adjustment is that limited maintenance resources may result in unsatisfactory hysteresis settings in cells that require recurrent modification. In view of the foregoing, it is an objective of the present invention to provide a method of setting the appropriate hysteresis levels for reducing oscillating handoffs and improving network performance.

SUMMARY OF THE INVENTION

Briefly described, and in accordance with embodiments thereof, the invention discloses a method of setting appropriate hysteresis levels for cells in order to reduce the rate of oscillating handoffs arising from an ordinary mobile station handoff from an originating cell to at least one neighboring cell in a wireless telecommunication network. The method includes measuring a received signal strength within the originating cell by the mobile station (MS), for example. The signal strength of the transmitted signals of at least one base station (BS) of a neighboring cell is also measured and reported to the system. A measure of fluctuation is calculated by applying a statistical operation, for example the standard deviation, to at least one of the measured received signal strengths. In a first embodiment, the calculated hysteresis value is based on the fluctuation measure. In a second embodiment, the calculated hysteresis value, in addition to the fluctuation measure, includes the oscillation rate. The calculated hysteresis values may then be presented to the network operator for manual adjustment of cell hysteresis levels or the values may be an input into procedures for self-configuring cells to provide automatic adjustment.

The present invention provides an adaptive hysteresis method for use in dynamically fine tuning hysteresis on a cell-by-cell basis. Optimal hysteresis levels improve network performance by reducing oscillating handoffs which in turn improves connection reliability, network capacity, and speech quality. The method eliminates tedious manual analysis of traffic patterns thereby lowering maintenance costs. Moreover, the method is especially suitable for use in networks comprising substantial numbers of cells, such as microcell environments which may be particularly sensitive to performance degradation due to unsatisfactory hysteresis settings.

BRIEF DESCRIPTION OF THE DRAWINGS

The invention, together with further objects and advantages thereof, may best be understood by reference to the following description taken in conjunction with the accompanying drawings in which.

DETAILED DESCRIPTION OF THE PREFERRED EMBODIMENTS

A discussion directed toward the affect of hysteresis on handoffs between cells was provided in the preceding sections. In digital systems operating in accordance with a time division multiple access (TDMA) transmission protocol such as, for example, Digital Advanced Mobile Phone System (D-AMPS), speech and control data are transmitted in bursts of digitally modulated packets of data transmitted in frames which are further sub-divided into six time slots. This arrangement permits the necessary data associated with the conversation to be systematically transmitted within allocated time slots within the frames.

Figure 1:
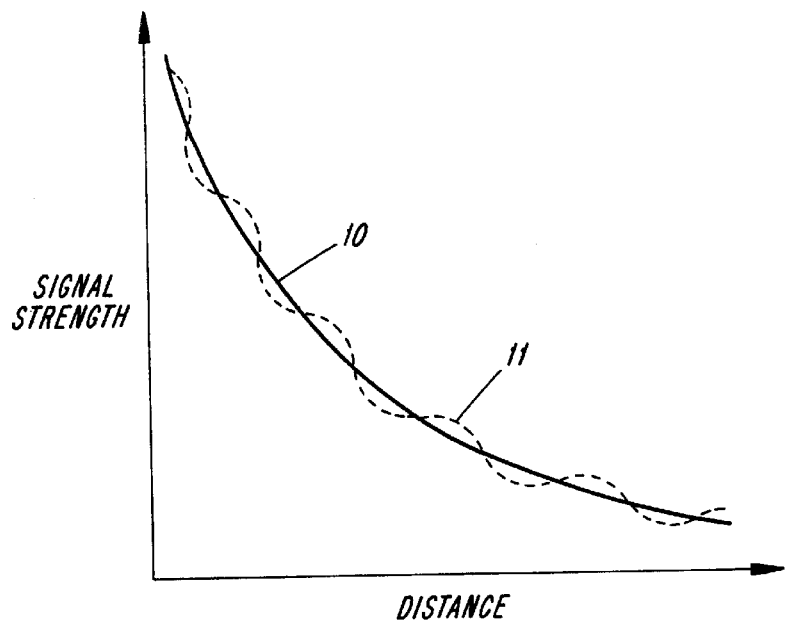
FIG. 1 is a graph of a received signal containing fluctuations versus distance.
Figure 2:
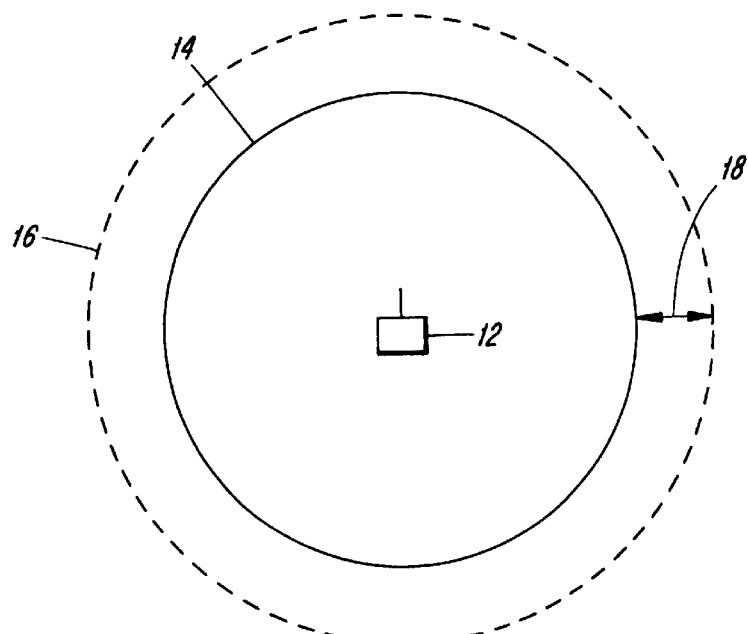
FIG. 2 illustrates the hysteresis associated with an exemplary omnidirectional cell.
Figure 3:
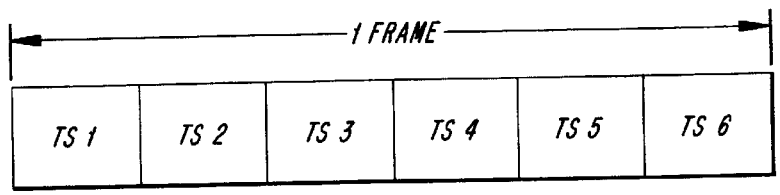
FIG. 3 is an illustration of a data transmitted in time slots to form a frame of data transmitted in accordance with a TDMA protocol.

Referring now to FIG. 3 an exemplary illustration of a single frame of data as transmitted in accordance with a TDMA protocol is show. In a D-AMPS "full-rate" transmission protocol, the frame consists of six time slots, labeled TS1 through TS6 respectively, wherein received speech data and sent speech data are each transmitted in two time slots. At least one time slot, e.g. TS2, is available for performing signal strength measurements that are associated with handoff operations. It should be understood that other TDMA based systems, such as Global System for Mobile Communication (GSM), may specify different frame lengths and time slot allocations and that the example described is merely exemplary. By way of example, the handoff technique used in D-AMPS may be characterized by a system which is constantly looking for a more suitable cell for the MS to hand off to by having the MS continually can a plurality of control channels transmitted by neighboring BS's. It should be noted that it is also possible to scan other channels, such as voice channels, from neighboring BS's.

On the downlink of the serving BS, signal strength measurements are made on the speech data transmitted in any of the associated time slots TS1 and TS4 by the MS at regular intervals. In addition, signal strength measurements are performed by the MS on the scanned downlink channels of neighboring cells according to a predetermined list of frequencies ad are reported to the originating BS.

Figure 4:
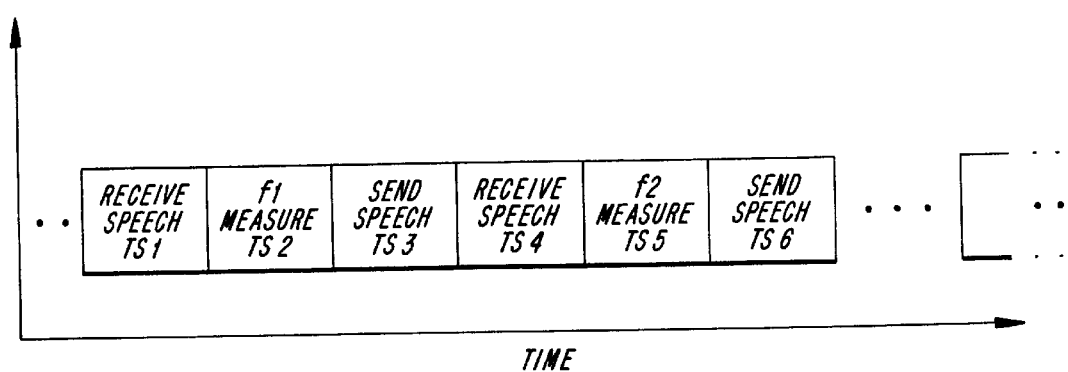
FIG. 4 is an illustration of partial frames of transmitted time slots containing speech data and signal strength measurements.

FIG. 4 illustrates an exemplary transmission scheme showing an entire frame and the respective time slots used for transmitting speech data and for performing signal strength measurements. Speech data is transmitted in TS1 and TS4 respectively for reception by the MS. Similarly, speech data sent by the MS is transmitted in TS3 and TS6 respectively. The MS is neither sending nor receiving during TS2 and TS5 in which measurements may be performed. To illustrate, the MS performs downlink measurements on the control channels of neighboring cells corresponding to frequencies f1, f2, . . . etc. The average values of these measurements are periodically reported by MS to the BS of the originating cell at regular intervals. It should be noted that the measurements are not necessarily performed for every frame but can be done only periodically on successive frames. The signal strength of the present call, with the hysteresis added, is compared with the signal strength of the neighbors. A handoff is initiated when the signal strength of a neighbor (RSSI_neighbor) is higher than that of originating cell (RSSI_orig) plus hysteresis i.e. satisfying the condition:

$$RSSI\_neighbor > RSSI\_orig + SSHY \quad (I)$$

where SSHY is the hysteresis signal strength of the originating cell. When this condition is met, a handoff request is sent to the MSC and various quality measurement procedures are initiated to verify that the potential neighboring BS can successfully communicate with the MS. When everything checks out, the MSC issues a handoff order to the MS to switch to the new channel.

It can be seen from the relation above that hysteresis plays a role in handoff decisions. Accordingly, it follows that proper level setting is a important factor in reducing oscillating handoffs and improving network performance In accordance with an exemplary procedure of the present invention, a method of providing an adaptive hysteresis capability in wireless telecommunication networks is described. Hysteresis is one of a number of parameters set by the network operator that can significantly affect network performance. The method of the present invention provides a technique for calculating and setting the hysteresis levels to appropriate levels.

The proper hysteresis level is typically determined, in part, by analysis of cell traffic including analyzing the rate of oscillating handoffs. Fluctuations in the received signal strength can influence the rate of oscillating handoffs. Therefore, the calculation of the appropriate hysteresis for a given cell should take signal fluctuations in account. One possible technique is to take the standard deviation of the difference in the received signal strengths. In accordance with a first embodiment of the present invention, a calculation of hysteresis level (SSHY) is determined by the relationship:

$$SSHY = std\_dev(RSSI\_orig - RSSI\_neighbor) \quad (II)$$

where RSSI_orig is the signal strength measured in the originating cell by the MS and RSSI_neighbor is the received signal strength reported by the BS of a neighboring cell. The standard deviation is used to provide a statistical measure of the fluctuating nature of the signals. The calculated hysteresis level can then be incorporated in the above relationship (I) for determining the condition for handoff.

Network operators are aware of the relationship that exists between oscillating handoffs and the cell hysteresis. By way of example, it is a known practice to increase the hysteresis level in an effort to reduce the rate of oscillating handoffs. In accordance with a second embodiment, this association may be included in the hysteresis level calculation for an improved correlation. For example, the hysteresis level (SSHY) may be determined from the expression:

$$SSHY = std\_dev(RSSI\_orig - RSSI\_neighbor) + C1 + f(osc.\_rate) \quad (III)$$

where the osc.\_rate is the rate of oscillating handoff. The constant C1 may be included to provide for a minimum hysteresis and to compensate for measurement inaccuracies e.g. due to the measuring resolution of mobile phones. A typical value for C1 may be in the range of about 2 dB. By way of illustration, many phones have a resolution of 2 dB increments when making signal strength measurements and the failure to compensate for this may result in inaccurate readings that may lead to unexpected consequences. As an example, when a signal strength measurement after the handoff is very close to the one taken prior to the handoff, this may lead to a 2 dB higher or lower measurement which may be triggered by any minute change in position. This may induce an undesirable oscillating handoff back to the originating cell. The nominal value of C1 may be adjusted or fine-tuned as determined by experimentation.

The oscillation rate is included to incorporate the affects of the handoff oscillation rate on the hysteresis level. For instance, if the rate of oscillating handoffs for the cell is high, e.g. due to weak spots in coverage from obstructions, terrain etc., the effect will be to increase the hysteresis proportionally until the rate declines to an acceptable level. Correspondingly, if the oscillation rate is low, the auto-correcting nature of the algorithm will tend to reduce the hysteresis which in turn increases handoff efficiency and improves system performance. Furthermore, the oscillation rate may be determined on a cell-by-cell basis and is expressed as a percentage of oscillating handoffs out of a sample number of handoffs between the cells e.g. out of one hundred handoffs.

The function f(osc.\_rate) is a weighting function of the oscillation rate in order to regulate the contribution of oscillation rate on the calculated hysteresis. The function f(osc.\_rate) may be a constant value multiplied with the oscillation rate but it may also vary in accordance with the oscillation rate. To illustrate, a stepped normalized weighting approach may be applied such that a relatively low oscillation rate of around 2–3%, which is typically considered acceptable, results in a normalized weighting of f(osc.\_rate) that is insignificant. Oscillation rates in the range of 4–20% should be given a higher normalized weighting for f(osc.\_rate) and rates greater than 20% may be give a still higher normalized weight as illustrated in the example below:

$$f(osc.\_rate) = 0 \quad \text{for an oscillation rate} < 2\%$$
$$f(osc.\_rate) = 1 \quad 2\% < \text{oscillation rate} < 10\%$$
$$f(osc.\_rate) = 2 \quad 10\% < \text{oscillation rate} < 20\%$$
$$f(osc.\_rate) = 3 \quad \text{oscillation rate} > 20\%$$

In addition, it is possible to use any suitable continuous function for f(osc.\_rate) that may produce an effective weighting for the oscillation rate.

The present invention contemplates a method of providing an adaptive hysteresis technique for use in dynamically fine tuning network performance. The method may be implemented in a manner that advises the operator of the proper hysteresis settings or may be proactive in that the hysteresis is automatically adjusted. The technique is especially suitable for use with self-configuring cells in microcell environments which comprise many relatively small cells. Since the affect of improper hysteresis settings on network performance in microcell applications is typically more pronounced, the method allows for rapid corrections in hysteresis levels for maintaining optimal performance. Furthermore, the method lowers maintenance costs by reducing the amount of time operators spend manually fine tuning their networks.

While the invention has been described with reference to specific embodiments, the description is illustrative of the invention and is not to be construed as limiting to the invention. In particular, the signal strength measurements have been described as being performed by the MS on downlink signals. It is also possible to calculate the hysteresis based on uplink measurements done by the originating BS and neighboring BS's which may be appropriate for analog systems. Furthermore, it is possible to calculate the hysteresis SSHY based on the standard deviation of only one of received signals e.g. RSSI\_orig or RSSI\_neighbor. It is also possible to calculate the hysteresis based on the standard deviation of the difference between received signals of the originating cell immediately before and after the handoff. Still further, other statistical measures can be used e.g. the variance instead of standard deviation. Therefore, various modifications and applications may occur to those skilled in the art without departing from the true spirit and scope of the invention as defined by the appended claims.

What is claimed is:

1. A method of optimizing a hysteresis level used to determine whether to handoff a mobile station to a neighboring cell by adding said hysteresis level to a measured signal strength of a signal transmitted by said originating cell, the method comprising the steps of:

measuring, by a plurality of mobile stations, a received signal strength in said originating cell;

measuring, by said plurality of mobile stations, said received signal strength of said neighboring cell;

determining a difference between said measured signal strengths;

calculating a measure of fluctuation based on said difference between said measured received signal strengths; and calculating the hysteresis level based on said measure of fluctuation.

2. A method according to claim 1 wherein said step of measuring a received signal strength in said originating cell is performed by the mobile station.

3. A method according to claim 1 wherein said step of measuring a received signal strength in said originating cell is performed by the originating base station.

4. A method according to claim 1 wherein said step of measuring said received signal strength of said neighboring cell is performed by the mobile station.

5. A method according to claim 1 wherein said step of measuring said received signal strength of said neighboring cell is performed by the base station of said neighboring cell.

6. A method according to claim 1 wherein said fluctuation calculation step includes calculating the standard deviation of at least one of the measured received signal strengths.

7. A method according to claim 6 wherein said fluctuation calculation step includes calculating the standard deviation of the difference in received signal strengths from the originating cell and a neighboring cell respectively.

8. A method according to claim 1 wherein said calculating hysteresis step further includes the step of adding the handoff oscillation rate.

9. A method according to claim 8 wherein said calculating hysteresis step further includes adding a compensating constant value.

10. A method according to claim 1 wherein the cell hysteresis level in the network is automatically adjusted in accordance with the calculated hysteresis level.

11. A system for setting a hysteresis level used to determine whether to handoff a mobile station from an originating cell to a neighboring cell in a wireless telecommunication network, said system comprising:

means for measuring, by a plurality of mobile stations, received signal strength in said originating cell;

means for measuring, by a plurality of mobile stations, received signal strength of said neighboring cells;

means for determining a difference between said measured received signals from each of said plurality of mobile stations;

means for determining the fluctuation of said received signal strengths based on said difference; and means for calculating said hysteresis values based on said fluctuation.

12. A system according to claim 11 wherein said signal measuring means in said originating cell are located in the mobile station.

13. A system according to claim 11 wherein said signal measuring means in said originating cell are located in the base station of the originating cell.

14. A system according to claim 11 wherein said means for measuring received signal strength of said neighboring cell is located in the mobile station.

15. A system according to claim 11 wherein said means for measuring received signal strength of said neighboring cell is located in the base station of said neighboring cell.

16. A system according to claim 11 wherein said means for calculating said hysteresis are performed by the base station of the originating cell.

17. A system according to claim 11 wherein said calculating means further includes means for determining handoff oscillation rate, and wherein the calculated hysteresis is based on the fluctuation together with the oscillation rate.

* * * * *